United States Patent
Beardsley et al.

(10) Patent No.: US 10,484,659 B2
(45) Date of Patent: Nov. 19, 2019

(54) LARGE-SCALE ENVIRONMENTAL MAPPING IN REAL-TIME BY A ROBOTIC SYSTEM

(71) Applicant: Disney Enterprises, Inc., Burbank, CA (US)

(72) Inventors: Paul Beardsley, Zurich (CH); Anurag Sai Vempati, Dietlikon (CH); Juan Nieto, Küsnacht (CH); Igor Gilitschenski, Stuttgart (DE)

(73) Assignees: Disney Enterprises, Inc., Burbank, CA (US); ETH Zurich, Zurich (CH)

( * ) Notice: Subject to any disclaimer, the term of this patent is extended or adjusted under 35 U.S.C. 154(b) by 99 days.

(21) Appl. No.: 15/693,092

(22) Filed: Aug. 31, 2017

(65) Prior Publication Data
US 2019/0068940 A1 Feb. 28, 2019

(51) Int. Cl.
*H04N 13/122* (2018.01)
*G06T 17/05* (2011.01)
(Continued)

(52) U.S. Cl.
CPC ......... *H04N 13/122* (2018.05); *G05D 1/0011* (2013.01); *G05D 1/021* (2013.01);
(Continued)

(58) Field of Classification Search
CPC .. H04N 13/122; H04N 13/257; H04N 13/271; H04N 13/296; H04N 13/25;
(Continued)

(56) References Cited

U.S. PATENT DOCUMENTS

| 10,304,237 B2 * | 5/2019 | Sequeira | G01C 21/206 |
| 2008/0027591 A1 * | 1/2008 | Lenser | G05D 1/0251 |
| | | | 701/2 |

(Continued)

OTHER PUBLICATIONS

R. A. Newcombe, et al. "Kinectfusion: Real-time Dense Surface Mapping and Tracking," *Mixed and Augmented Reality (ISMAR), 2011 10th IEEE International Symposium*. IEEE, 2011, pp. 127-136.

(Continued)

*Primary Examiner* — Mia M Thomas
(74) *Attorney, Agent, or Firm* — Farjami & Farjami LLP

(57) ABSTRACT

According to one implementation, a robotic system for performing large-scale environmental mapping in real-time includes a mobile reconnaissance unit having a color sensor, a depth sensor, and a graphics processing unit (GPU) with a GPU memory, and a navigation unit communicatively coupled to the mobile reconnaissance unit and having a central processing unit (CPU) with a CPU memory. The robotic system begins a three-dimensional (3D) scan of an environment of the mobile reconnaissance unit using the color sensor and the depth sensor, and generates mapping data for populating a volumetric representation of the environment. The robotic system continues the 3D scan of the environment using the color sensor and the depth sensor, updates the mapping data, and partitions the volumetric representation between the GPU memory and the CPU memory based on a memory allocation criteria.

20 Claims, 5 Drawing Sheets

(51) Int. Cl.
| | |
|---|---|
| *G06T 15/08* | (2011.01) |
| *G05D 1/00* | (2006.01) |
| *G05D 1/02* | (2006.01) |
| *H04N 13/25* | (2018.01) |
| *H04N 13/257* | (2018.01) |
| *H04N 13/271* | (2018.01) |
| *H04N 13/296* | (2018.01) |
| *G06T 15/00* | (2011.01) |

(52) U.S. Cl.
CPC ......... *G05D 1/0202* (2013.01); *G05D 1/0206* (2013.01); *G06T 15/08* (2013.01); *G06T 17/05* (2013.01); *H04N 13/25* (2018.05); *H04N 13/257* (2018.05); *H04N 13/271* (2018.05); *H04N 13/296* (2018.05); *G06T 15/005* (2013.01)

(58) Field of Classification Search
CPC .. G05D 1/0011; G05D 1/0202; G05D 1/0206; G05D 1/021; G06T 15/08; G06T 17/05; G06T 15/005
See application file for complete search history.

(56) References Cited

U.S. PATENT DOCUMENTS

| | | | | |
|---|---|---|---|---|
| 2008/0253613 | A1* | 10/2008 | Jones | G06F 3/017 382/103 |
| 2009/0180668 | A1* | 7/2009 | Jones | G06F 3/017 382/103 |
| 2010/0092079 | A1* | 4/2010 | Aller | G06K 9/3216 382/165 |
| 2011/0026770 | A1* | 2/2011 | Brookshire | G05D 1/0251 382/103 |
| 2012/0182392 | A1* | 7/2012 | Kearns | B25J 11/009 348/46 |
| 2012/0250984 | A1* | 10/2012 | Taylor | G06K 9/00771 382/162 |
| 2014/0240492 | A1* | 8/2014 | Lee | H04N 5/2256 348/136 |
| 2014/0348380 | A1* | 11/2014 | Yoon | G06K 9/32 382/103 |
| 2016/0312446 | A1* | 10/2016 | Pettersson | E02F 9/262 |
| 2018/0302548 | A1* | 10/2018 | Bao | G03B 15/006 |

OTHER PUBLICATIONS

R. A. Newcombe, et al. "Dtam: Dense Tracking and Mapping in Real-time," *2011 International Conference on Computer Vision.* IEEE, 2011, pp. 2320-2327.

T. Whelan, et al. "Elasticfusion: Dense Slam Without a Pose Graph," *Proceedings of Robotics: Science and Systems (RSS)*, 2015. pp. 1-9.

T. Whelan, et al. "Kintinuous: Spatially extended kinectfusion," Technical report, 2012. pp. 1-8.

T. Whelan, et al. "Deformation Based Loop Closure for Large Scale Dense rgb-d Slam," *2013 IEEE/RSJ International Conference on Intelligent Robots and Systems.* IEEE, 2013, pp. 548-555.

* cited by examiner

LARGE-SCALE ENVIRONMENTAL MAPPING IN REAL-TIME BY A ROBOTIC SYSTEM

BACKGROUND

The generation of detailed and accurate representations of a local environment, using dense simultaneous localization and mapping (dense SLAM) methods, for example, can be important for robotics applications such as navigation and scene interpretation. Although one obstacle to successfully producing such environmental representations has been the processing overhead required by dense SLAM, advances in computing technology have made that particular obstacle less formidable. For example, powerful graphics processing units (GPUs) enabling dense SLAM algorithms to harness the power of parallelization are now widely available.

Several further challenges need to be addressed in order to make dense SLAM suitable for real-world applications, however. For example, conventional dense SLAM systems typically do not scale to large-scale environments because they are constrained by GPU memory, thus limiting the size of the area that can be mapped. Another limitation is the inability to handle rapid or abrupt camera motion, which is particularly problematic for agile aerial robotic vehicles, such as aerial drones, for example.

SUMMARY

There are provided robotic systems and methods for performing large-scale environmental mapping in real-time, substantially as shown in and/or described in connection with at least one of the figures, and as set forth more completely in the claims.

DETAILED DESCRIPTION

Figure 1:
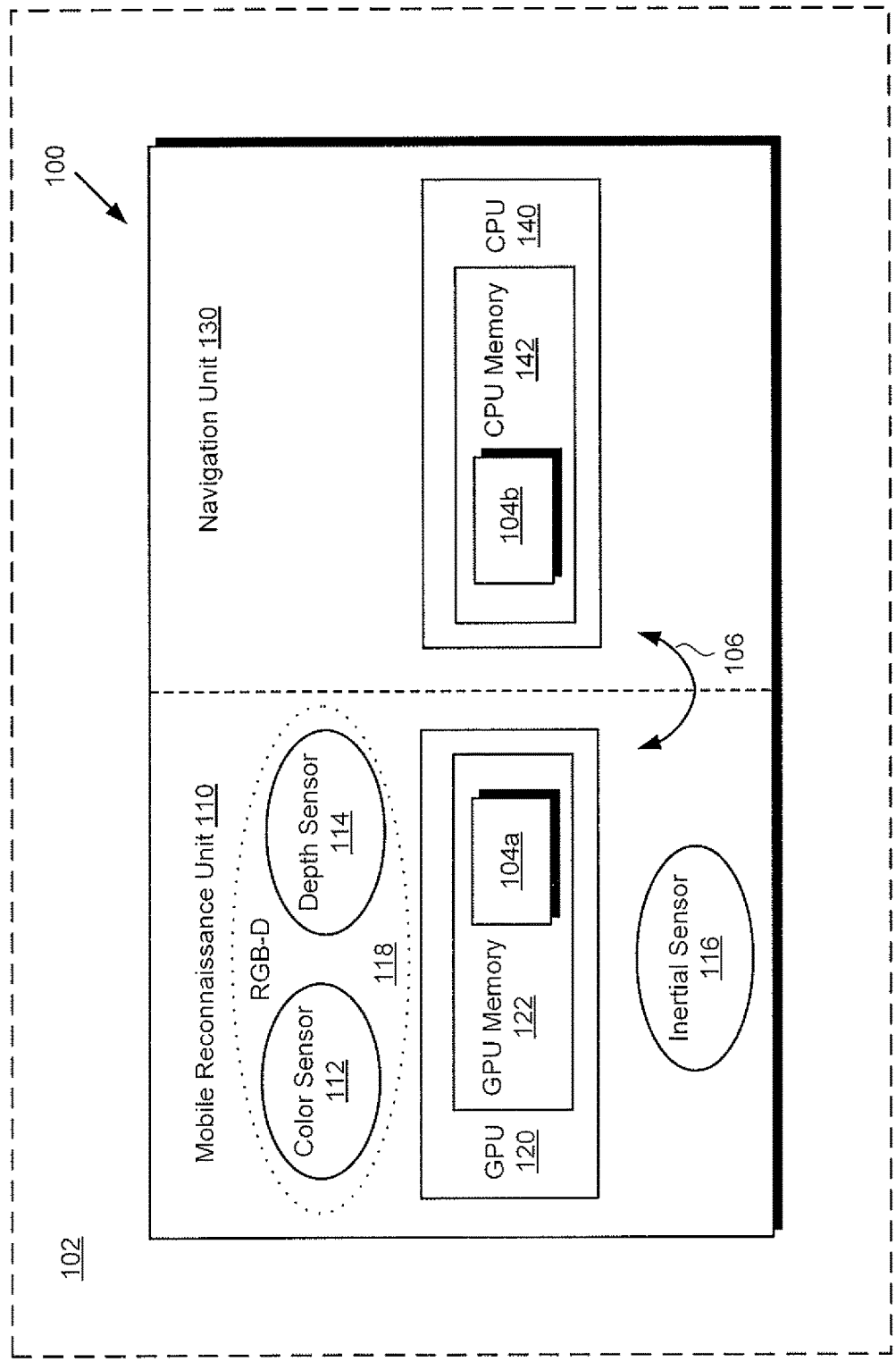
FIG. 1 shows an exemplary robotic system for performing large-scale environmental mapping in real-time, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As stated above, the generation of detailed and accurate representations of a local environment, using dense simultaneous localization and mapping (dense SLAM) methods, for example, can be important for robotics applications such as navigation and scene interpretation. One historical obstacle to successfully producing such environmental representations has been the processing overhead required by dense SLAM. However, powerful graphics processing units (GPUs) enabling dense SLAM algorithms to harness the power of parallelization are now widely available.

Nevertheless, and as also stated above, several further challenges need to be addressed in order to make dense SLAM suitable for real-world applications. For example, conventional dense SLAM systems typically do not scale to large-scale environments because they are constrained by GPU memory, thus limiting the size of the area that can be mapped. Another limitation is the inability to handle rapid and abrupt camera motion, which is particularly problematic for agile aerial robotic vehicles, such as aerial drones, for example. In addition, camera tracking may drift over time, resulting in inaccurate maps of the environment.

The present application discloses solutions for performing large-scale environmental mapping in real-time that address and overcome the deficiencies in the conventional art described above. By partitioning volumetric representations of an environment undergoing mapping between GPU memory and central processing unit (CPU) memory, the present solution advantageously enables scalable, dense, mapping in real-time, while concurrently guaranteeing a fixed GPU memory footprint. In addition, by integrating color, depth, and inertial odometry measurements, the present solution further advantageously enables accurate mapping despite rapid or abrupt movements by a mobile reconnaissance unit used in the mapping process. Moreover, the present solution includes novel and inventive raycasting techniques for generating maps of portions of the environment previously scanned by the mobile reconnaissance unit, thereby facilitating robust drift quantization.

FIG. 1 shows exemplary robotic system 100 for performing large-scale environmental mapping in real-time, according to one implementation. According to the exemplary implementation shown in FIG. 1, robotic system 100 is situated in, and is designed to perform real-time mapping of, large-scale environment 102. Large-scale environment 102 may be an indoor environment, such as a room, theme park attraction, or movie or television set, for example. Large-scale environment 102 may correspond to a spatial volume of approximately one thousand cubic meters (1000 m$^3$) for example, or greater. Large-scale environment 102 may be based on the surface area and/or volume of the environment to be scanned, rather than on the length of a camera trajectory during scanning.

As shown in FIG. 1, robotic system 100 includes mobile reconnaissance unit 110 and navigation unit 130. Mobile reconnaissance unit 110 includes color sensor 112, depth sensor 114, inertial sensor 116, and GPU 120 having GPU memory 122. Navigation unit 130 includes CPU 140 having CPU memory 142. Also shown in FIG. 1 are communication link 106 communicatively coupling navigation unit 130 to mobile reconnaissance unit 110, and a volumetric representation of large-scale environment 102 partitioned between GPU memory 122 and CPU memory 142 as volumetric representation 104a and 104b (hereinafter "volumetric representation 104a-104b"). Volumetric representation 104a-

104*b* of large-scale environment 102 may be based on a voxel grid of truncated signed distance function (TSDF) entries, for example.

In some implementations, as shown in FIG. 1, navigation unit 130 may be mechanically integrated with mobile reconnaissance unit 110 so as to move with mobile reconnaissance unit 110. In those implementations, substantially all large-scale environmental mapping functions performed by robotic system 100 in real-time are performed by one or both of mobile reconnaissance unit 110 and navigation unit 130, moving together and using one or both of GPU memory 122 and CPU memory 142.

In some other implementations, as discussed in greater detail below, navigation unit 130 may not be mechanically integrated with mobile reconnaissance unit 110, and therefore may remain stationary while mobile reconnaissance unit 110 is in motion. However, even in those latter implementations, navigation unit 130 is communicatively coupled to mobile reconnaissance unit 110 by communication link 106.

Mobile reconnaissance unit 110 may be implemented as any of several different mobile hardware platforms. In one exemplary implementation, mobile reconnaissance unit 110 may be an unmanned aerial vehicle, such as an aerial drone, for instance. However, in other implementations, mobile reconnaissance unit 110 may be a land based vehicle, such as an unmanned wheeled vehicle, an unmanned legged vehicle, or an unmanned vehicle employing a continuous track propulsion system, e.g., a tank or tractor. In yet other implementations, mobile reconnaissance unit 110 may take the form of a watercraft, such as an unmanned boat or unmanned submersible vehicle.

As noted above, mobile reconnaissance unit 110 includes color sensor 112, depth sensor 114, and inertial sensor 116. In one implementation, for example, color sensor 112 may take the form of an RGB camera, as known in the art. Moreover, in some such implementations, color sensor 112, when implemented as an RGB camera, and depth sensor 114 may form an integrated RGB-D sensor of mobile reconnaissance unit 110. Inertial sensor 116 may be implemented as an inertial measurement unit (IMU), as known in the art, including one or more gyroscopes, one or more accelerometers, and in some implementations, one or more magnetometers.

Robotic System 100 is designed to map large-scale environment 102 in real-time. Robotic system 100 may be configured to process 3D scan data at the rate at which it is available from color sensor 112, depth sensor 114, and inertial sensor 116. For example, in one implementation, real-time performance may correspond to data processing at a rate in a range from approximately twenty milliseconds (20 ms) up to approximately 30 ins, 40 ms, 50 ms, or 60 ms per frame.

As another example, in implementations in which large-scale environment 102 corresponds to a spatial volume of approximately 1000 m$^3$, robotic system 100 can produce a highly dense mapping at a resolution of approximately one centimeter (1.0 cm.) in a mapping process lasting from two to three minutes. In such an implementation, for example, volumetric representation 104*a*-104*b* of large-scale environment 102 may be based on a voxel grid of TSDF entries corresponding to several tens of millions of mesh vertices.

Figure 2:
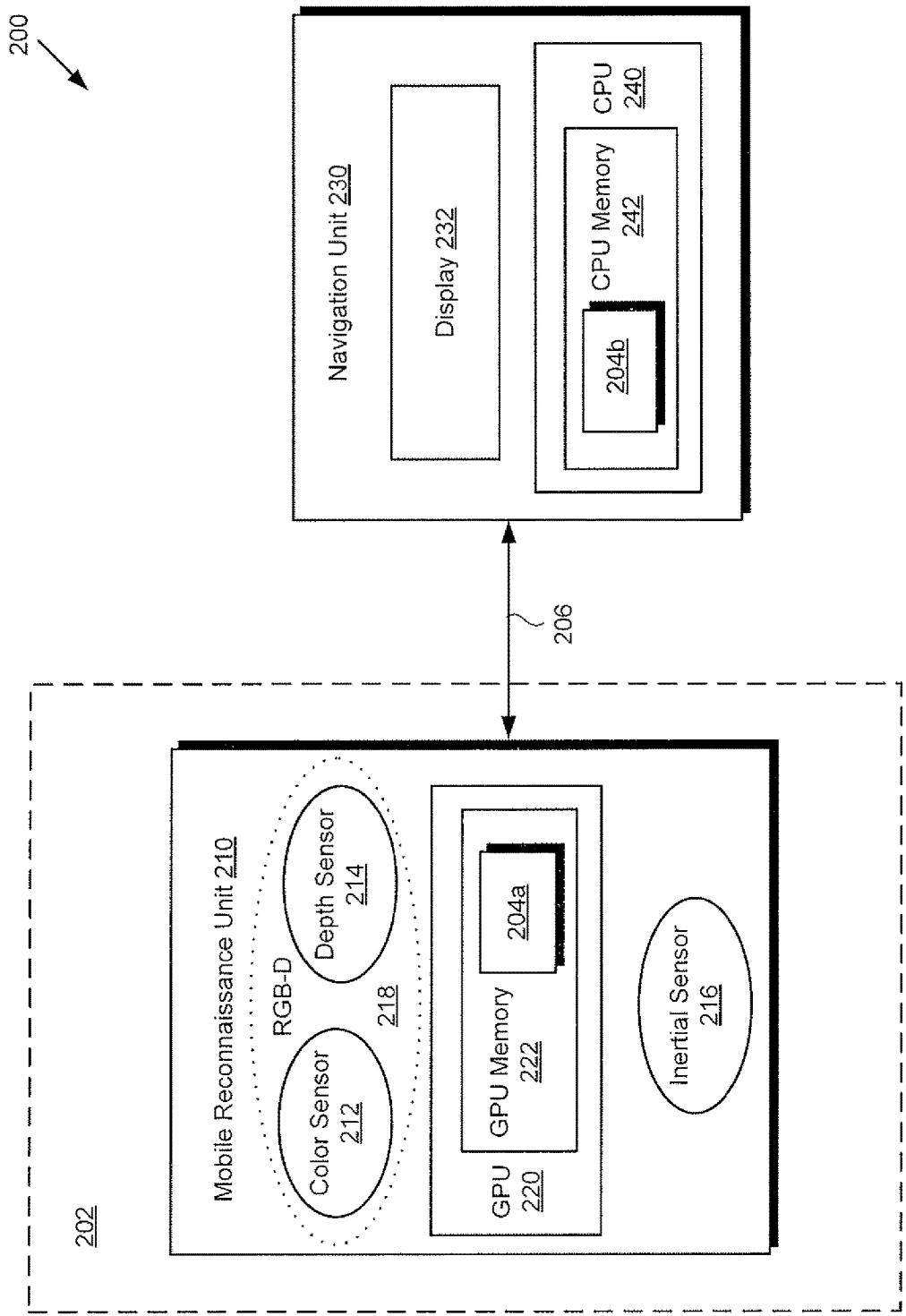
FIG. 2 shows an exemplary robotic system for performing large-scale environmental mapping in real-time, according to another implementation.

FIG. 2 shows exemplary robotic system 200 for performing large-scale environmental mapping in real-time, according to another implementation. As shown in FIG. 2, robotic system 200 includes mobile reconnaissance unit 210 and navigation unit 230 communicatively coupled to mobile reconnaissance unit 210 by communication link 206, which may be a wired or wireless communication link. According to the exemplary implementation shown in FIG. 2, mobile reconnaissance unit 210 of robotic system 200 is situated in, and is designed to perform real-time mapping of, large-scale environment 202.

Robotic system 200 corresponds in general to robotic system 100, in FIG. 1, and those corresponding features may share any of the characteristics attributed to either corresponding feature by the present disclosure. However, it is noted that, according to the implementation shown in FIG. 2, navigation unit 230 is not mechanically integrated with mobile reconnaissance unit 210, and therefore may remain stationary while mobile reconnaissance unit 210 is in motion. In one such implementation, for example, navigation unit 230 may be a remote base station for controlling mobile reconnaissance unit 210 via a wireless communication link corresponding to communication link 206.

As shown in FIG. 2, mobile reconnaissance unit 210 includes color sensor 212, depth sensor 214, inertial sensor 216, and GPU 220 having GPU memory 222. In addition, in implementations in which color sensor 212 is an RGB camera, that RGB camera may be integrated with depth sensor 214 to form RGB-D sensor 218. Mobile reconnaissance unit 210, color sensor 212, depth sensor 214, inertial sensor 216, RGB-D sensor 218, and GPU 220 having GPU memory 222 correspond respectively in general to mobile reconnaissance unit 110, color sensor 112, depth sensor 114, inertial sensor 116, RGB-D sensor 118, and GPU 120 having GPU memory 122, in FIG. 1. That is to say, those corresponding features may share any of the characteristics attributed to either corresponding feature by the present disclosure. Thus, mobile navigation unit 210 may be implemented as any of an unmanned aerial vehicle, wheeled vehicle, legged vehicle, continuous track propulsion vehicle, or a watercraft such as an unmanned boat or submersible vehicle, for example.

As further shown in FIG. 2, navigation unit 230 includes CPU 240 having CPU memory 242, and display screen 232. Navigation unit 230 corresponds in general to navigation unit 130, in FIG. 1, and those corresponding features may share any of the characteristics attributed to either corresponding feature by the present disclosure. Thus, although not shown in FIG. 1, in some implementations, navigation unit 130 may include a display screen corresponding to display screen 232. It is noted that display screen 232 may take the form of a liquid crystal display (LCD), a light-emitting diode (LED) display, an organic light-emitting diode (OLED) display, or another suitable display screen that performs a physical transformation of signals to light.

Also shown in FIG. 2 is volumetric representation 204*a* and 204*b* of large scale environment 202 (hereinafter "volumetric representation 204*a*-204*b*"). Large-scale environment 202 and volumetric representation 204*a*-204*b* of large-scale environment 202 correspond respectively in general to large-scale environment 102 and volumetric representation 104*a*-104*b* of large-scale environment 102, in FIG. 1, and those corresponding features may share any of the characteristics attributed to either corresponding feature by the present disclosure. In other words, large-scale environment 202 may be an indoor environment, such as a room, theme park attraction, or movie or television set, for example, and may correspond to a spatial volume of approximately 1000 m$^3$, or greater. Moreover, like volumetric representation 104*a*-104*b* of large-scale environment 102, volumetric representation 204*a*-204*b* of large-scale environment 202 may be based on a voxel grid of TSDF entries, for example.

Figure 3:
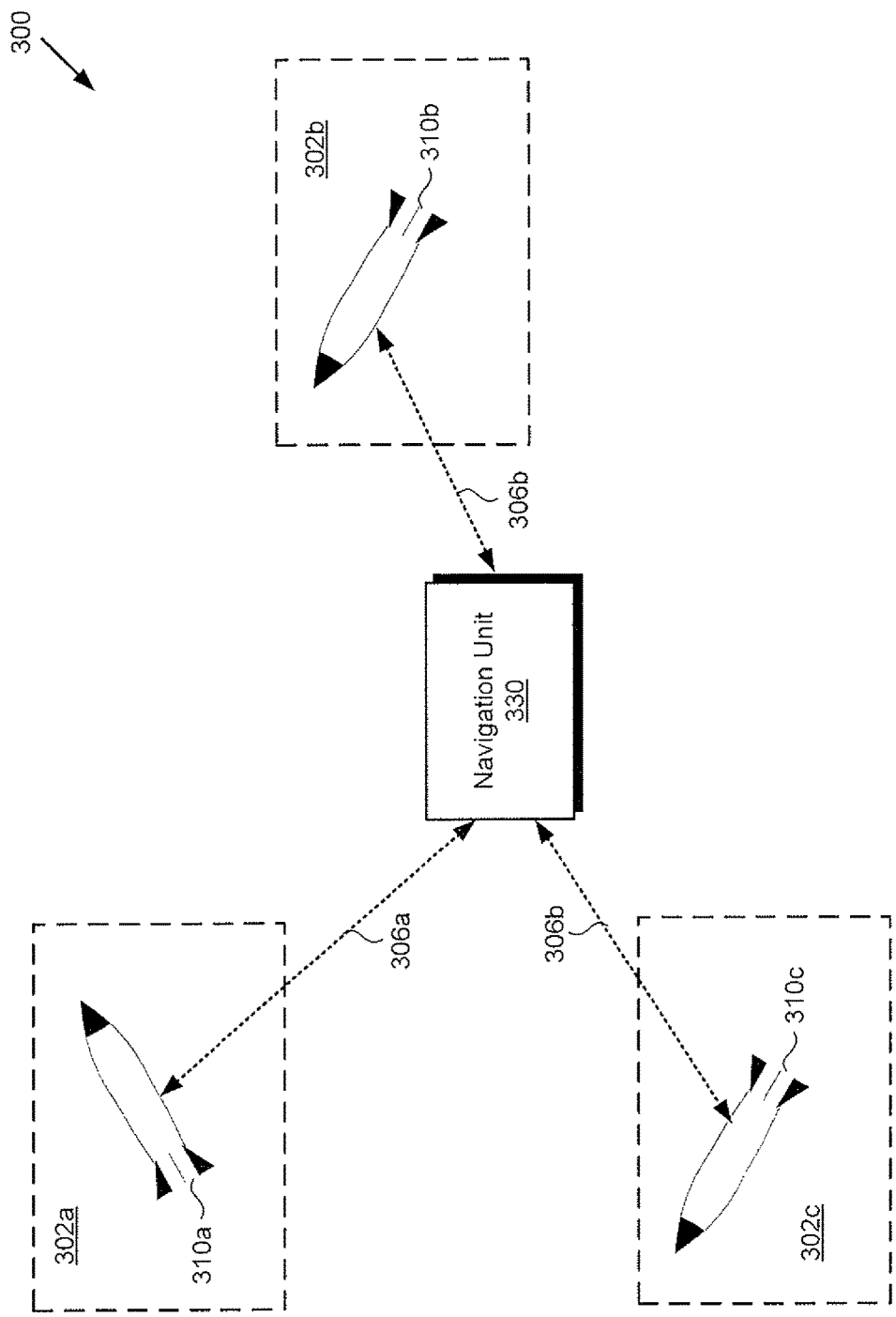
FIG. 3 shows an exemplary robotic system for performing large-scale environmental mapping in real-time, according to yet another implementation.

FIG. 3 shows exemplary robotic system 300 for performing large-scale environmental mapping in real-time, according to yet another implementation. As shown in FIG. 3, robotic system 300 includes multiple mobile each of mobile reconnaissance units 310a, 310b, and 310c by respective wireless communication links 306a, 306b, and 306c. According to the exemplary implementation shown in FIG. 3, mobile reconnaissance unit 310a of robotic system 300 is situated in, and is designed to perform real-time mapping of, large-scale environment 302a. In addition, according to that exemplary implementation, mobile reconnaissance units 310b and 310c of robotic system 300 may concurrently be situated in, and be designed to concurrently perform real-time mapping of, respective large-scale environments 302b and 302c.

Robotic system 300 corresponds in general to robotic system 100/200, in FIG. 1/2, and those corresponding features may share the characteristics attributed to any corresponding feature by the present disclosure. However, it is noted that, according to the implementation shown in FIG. 3, navigation unit 330 is not mechanically integrated with any of mobile reconnaissance units 310a, 310b, or 310c, and therefore may remain stationary while one or more of mobile reconnaissance units 310a, 310b, and 310c is/are in motion. In one such implementation, for example, navigation unit 330 may be a remote base station for controlling more than one, or all of mobile reconnaissance units 310a, 310b, and 310c.

Mobile reconnaissance units 310a, 310b, and 310c correspond in general to mobile reconnaissance unit 110/210, in FIG. 1/2, and those corresponding features may share the characteristics attributed to any corresponding feature by the present disclosure. That is to say, although mobile reconnaissance units 310a, 310b, and 310c are depicted as unmanned aerial vehicles in FIG. 3, that representation is merely exemplary. Like mobile reconnaissance unit 110/210 in FIG. 1/2, in other implementations, one or more of mobile reconnaissance units 310a, 310b, and 310c may be implemented as an unmanned wheeled vehicle or continuous track propulsion vehicle, a watercraft such as an unmanned boat or submersible vehicle, or as an unmanned spacecraft, for example.

Navigation unit 330, in FIG. 3, corresponds in general to navigation unit 130/230, in FIG. 1/2, and those corresponding features may share the characteristics attributed to any corresponding feature by the present disclosure. Moreover, large-scale environments 302a, 302b, and 302c, in FIG. 3, correspond respectively in general to large-scale environment 102/202, in FIG. 1/2, and those corresponding features may share the characteristics attributed to any corresponding feature by the present disclosure.

Figure 4:
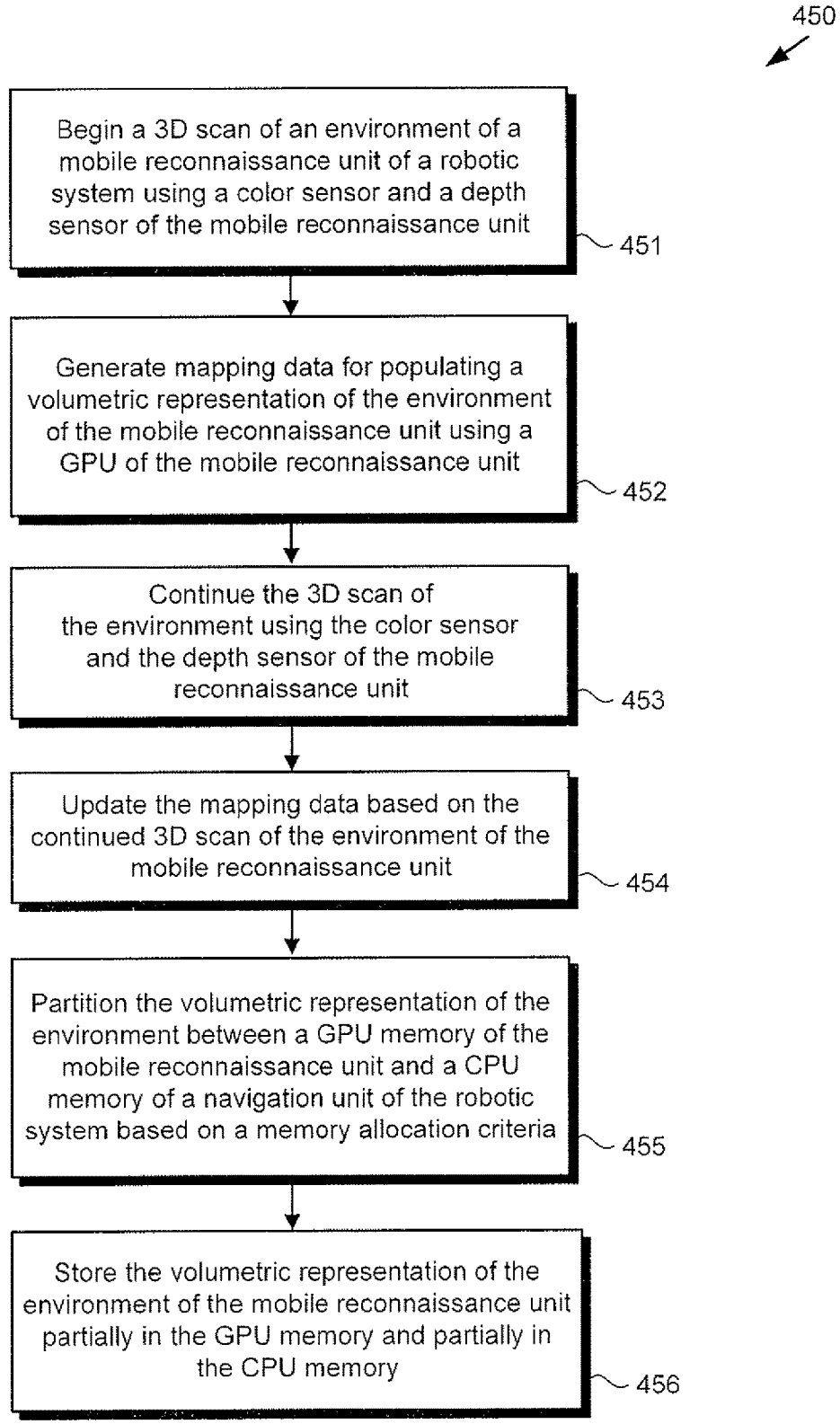
FIG. 4 shows a flowchart presenting an exemplary method for performing large-scale environmental mapping in real-time, according to one implementation.

The functionality of robotic system 100/200/300 will be further described by reference to FIG. 4. FIG. 4 shows flowchart 450 presenting an exemplary method for performing large-scale environmental mapping in real-time, according to one implementation. With respect to the method outlined in FIG. 4, it is noted that certain details and features have been left out of flowchart 450 in order not to obscure the discussion of the inventive features in the present application.

Referring now to FIG. 4 in combination with FIGS. 1, 2, and 3, flowchart 450 begins with beginning a three-dimensional (3D) scan of environment 102/202/302a/302b/302c of mobile reconnaissance unit 110/210/310a/310b/310c using color sensor 112/212 and depth sensor 114/214 (action 451). By way of example, mobile reconnaissance unit 110/210/310a/310b/310c may be implemented as an aerial drone, i.e., unmanned aerial vehicle, including RGB-D sensor 118/218 provided by color sensor 112/212 (hereinafter "camera 112/212") and depth sensor 114/214. Action 451 may correspond to an initial acquisition of RGB camera data and depth sensor data as mobile reconnaissance unit 110/210/310a/310b/310c moves within large-scale environment 102/202/302a/302b/302c, under the control of navigation unit 130/230/330.

Flowchart 450 continues with generating mapping data for populating volumetric representation 104a-104b/204a-204b of large-scale environment 102/202/302a/302b/302c using GPU 120/220 (action 452). As noted above, volumetric representation 104a-104b/204a-204b of large-scale environment 102/202/302a/302b/302c may be based on a voxel grid of TSDF entries. In one such implementation, for example, each voxel may include a signed distance function "scf" value, the time "t" at which the voxel was last updated, its "color", and the number of observations collected for that voxel, i.e., "$n_{obs}$,". In addition, each voxel may have an associated hash table entry including a pointer "ptr" to a voxel grid entry and its position "pos" in a global reference frame.

Generation of the mapping data may be performed by GPU 120/220 and may include pre-processing of the 3D scan initiated in action 451, tracking of camera 112/212, integration of data acquired by camera 112/212 with data acquired by depth sensor 114/214, and raycasting. Pre-processing may include conversion of disparity readings to depth point clouds, hole filling in depth data, finding voxel colors for depth measurements using calibration data, and building an image pyramid. Tracking of camera 112/212 may include camera pose estimation using photometric, visual-inertial odometry estimates, and depth data. Raycasting includes projection of rays along the current camera viewing direction to evaluate zero crossing points in the TSDF voxel grid, which may be used to build surface maps for performing tracking later during the 3D scan.

Flowchart 450 continues with continuing the 3D scan of environment 102/202/302a/302b/302c of mobile reconnaissance unit 110/210/310a/310b/310c using color sensor 112/212 and depth sensor 114/214 (action 453). Continuing to refer to the exemplary implementation in which mobile reconnaissance unit 110/210/310a/310b/310c is an aerial drone including RGB-D sensor 118/218 provided by camera 112/212 and depth sensor 114/214, action 453 may correspond to ongoing acquisition of RGB camera data and depth sensor data as mobile reconnaissance unit 110/210/310a/310b/310c continues to move within large-scale environment 102/202/302a/302b/302c.

Flowchart 450 continues with updating the mapping data based on the continued 3D scan of large-scale environment 102/202/302a/302b/302c of mobile reconnaissance unit 110/210/310a/310b/310c (action 454). Updating of the mapping data may be performed by GPU 120/220 of mobile reconnaissance unit 110/210/310a/310b/310c and CPU 140/240 of navigation unit 130/230/330. For example, in one exemplary implementation, CPU 140/240 may implement a visual-inertial Extended Kalman Filter (EKF).

For instance, in one implementation, for each odometry measurement available from the EKF implemented by CPU 140/240, an odometry update evaluates a differential pose change of camera 112/212 and updates the pose of camera 112/212 according to Equation 1:

$$T_{g_c}^{c,t+1} = ((T_c^i)^{-1} T_{g_o}^{i,t+1} (T_{g_o}^{i,t})^{-1} T_c^i) \times T_{g_c}^{c,t}$$

where $T_{g_c}^{c,t}$, $T_{g_o}^{i,t}$ are the camera 112/212 and inertial sensor 116/216 poses at time t referenced with respect to their respective inertial frames $g_c$ and $g_o$. It is noted that the transformation $T_c^i$ is the extrinsic calibration parameter describing misalignment between inertial sensor 116/216 and camera 112/212.

In some implementations, it may be advantageous or desirable to substantially minimize two different metrics for better alignment of depth data with the large-scale environmental scene, while also maintaining color consistency.

The first such metric to be substantially minimized is a point-to-plane metric defined by Equation 2:

$$E_t^D(p_t) = \sum_{p_t} \|\{(R_c^{gc,t} p_t + t_c^{gc,t}) - p_s\}^T N_s(p_s)\|_2$$

where, $p_t$ is a live depth measurement point at time t and $p_s$ is a corresponding point on the surface with a normal value $N_s(p_s)$, obtained using projective data association during raycasting. This metric is evaluated between the current depth image and the raycasted point map obtained from the TSDF voxel grid, and is minimized by employing an Iterative Closest Point (ICP) based tracker. $T_c^{gc,t} = [R_c^{gc,t} \cdot t_c^{gc,t}]$ are initialized to the estimates obtained from the odometry update and an incremental transform is applied using a small angle assumption to get an updated transform. Linearizing around the previous estimate allows for an iterative solution for minimizing Equation 2, which may be obtained by GPU 120/220 performing a GPU parallelizable computation. In addition, in some implementations, a hierarchical approach based on an image pyramid of varying resolutions may be employed, which advantageously allows for faster convergence.

The second metric to be minimized is substantially minimized in order to ensure color consistency between the present color image included in the mapping data and the large-scale environmental scene. That second metric is defined by Equation 3:

$$E_t^C(p_s) = \sum_{p_s} \|C_t(\pi(R_{gc}^{c,t} p_s + t_{gc}^{c,t})) - C_s(p_s)\|_2$$

Equation 3 is evaluated for each scene point $p_s$ obtained during raycasting with color values $C_s(p_s)$ and is projected into color image $C_t$ at time t with projection matrix $\pi$.

Flowchart 450 continues with partitioning volumetric representation 104a-104b/204a-204b of large-scale environment 102/202/302a/302b/302c between GPU memory 122/222 of mobile reconnaissance unit 110/210/310a/310b/310c and CPU memory 142/242 of navigation unit 130/230/330 based on a memory allocation criteria (action 455). Partitioning of volumetric representation 104a-104b/204a-204b of large-scale environment 102/202/302a/302b/302c between GPU memory 122/222 and CPU memory 142/242 may be performed by GPU 120/220 of mobile reconnaissance unit 110/210/310a/310b/310c.

Figure 5:
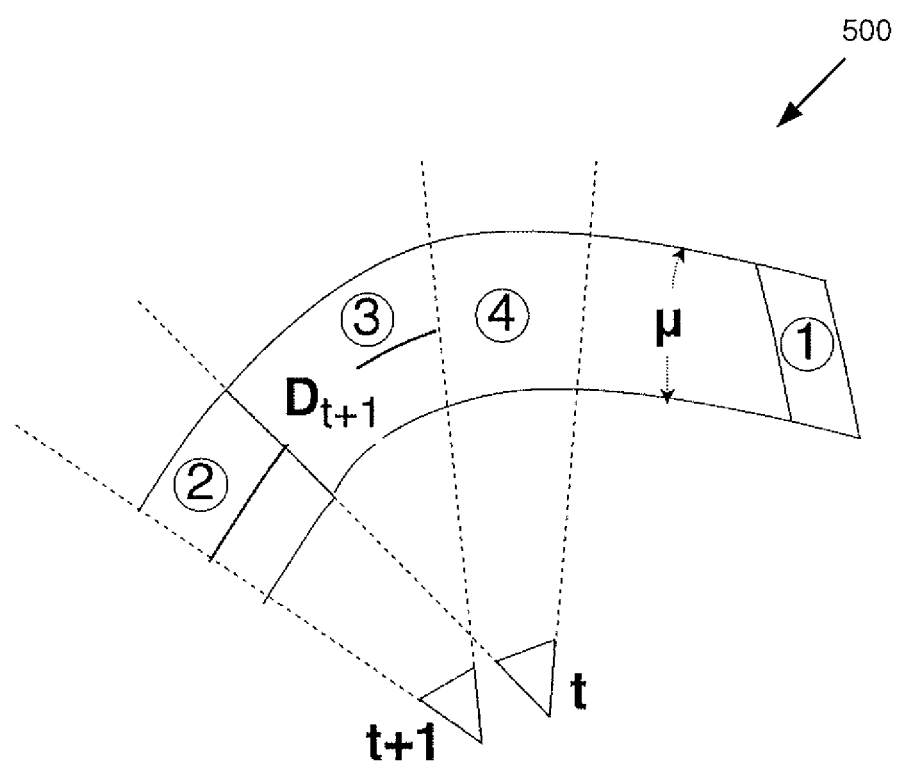
FIG. 5 shows a diagram depicting an exemplary process for partitioning a volumetric representation of a large-scale environment between a graphics processing unit (GPU) memory and a central processing unit (CPU) memory of a robotic system.

Referring to FIG. 5, FIG. 5 shows diagram 500 depicting an exemplary process for partitioning volumetric representation 104a-104b/204a-204b of large-scale environment 102/202/302a/302b/302c between GPU memory 122/222 and CPU memory 142/242. By way of example, as camera 112/212 spans across large-scale environment 102/202/302a/302b/302c from time t to t+1 in FIG. 5, the following procedure may be performed:

(a) Voxels which have not been updated for more than a predetermined time interval measured in seconds, i.e., "$t_{old}$" (Region 1 in FIG. 5) are moved out of GPU memory 122/222 and into CPU memory 142/242.

(b) Voxel locations belonging within a predetermined truncation bandwidth $\mu$ around the most recent depth measurement $D_{t+1}$ (Regions 2 and 3 in FIG. 5) are updated as follows: In the absence of a voxel at a required location, its memory is allocated to GPU memory 122/222, otherwise, the new depth measurement is integrated and that voxel entry is updated.

(c) CPU memory 142/242 is searched for the presence of previously stored voxels belonging to Regions 2 and 3 in FIG. 5. In case of a hit, the required voxel entries are requested by GPU memory 122/222.

(d) The voxels belonging to Regions 2 and 3 in FIG. 5 and found to be previously stored in CPU memory 142/242 are integrated into GPU memory 122/222. It is noted that transfer buffers may be used for implementing voxel transfers between GPU memory 122/222 and CPU memory 142/242.

As stated above, voxels that are earlier moved out to CPU memory 142/242 from GPU memory 122/222 may be requested by GPU memory 122/222 when a location within large-scale environment 102/202/302a/302b/302c is revisited. The present mapping solution includes a novel raycasting technique that incrementally estimates the zero crossings of these voxels.

For example, among the voxels being moved into GPU memory 122/222 from CPU memory 142/242, those with smaller sdf values and those with higher number of observations in evaluating the sdf value, i.e., $n_{obs}$, are considered to be more reliable. Consequently, a voxel reliability measure $\mathcal{R}(r) \in [0, 1]$ for voxel v may be defined by Equation 4:

$$\mathcal{R}(v) = \alpha\left(\frac{n_{obs}}{n_{max}}\right) + \beta\left(1 - \frac{|sdf|}{\mu}\right)$$

where, $n_{max}$ is the maximum number of observations after which no additional observations are combined for evaluating the sdf value, $\mu$ is the truncation bandwidth for the sdf values, and $\alpha$ and $\beta$ are weights for the individual reliability terms.

Each individual voxel v and its corresponding hash table entry h can then be used to estimate a point $p_{0,v}$ on a zero crossing surface using its sdf value according to Equation 5:

$$\vec{r} = \frac{h \cdot pos - p_c}{\|h \cdot pos - p_c\|}$$

$$p_{0,r} = h \cdot pos + \{\vec{r} \times sdf\}$$

For each voxel v moved into GPU memory 122/222 from CPU memory 142/242 at time t, a raycast estimate $R_t^*$ can be generated by forward projecting the corresponding $p_{0,v}$ onto the image plane of camera 112/212. In the case where multiple $p_{0,v}$ points project into the same voxel location, the one with the highest reliability score is stored in $R_t^*$ along with its corresponding score. As time progresses during the mapping, more voxels are moved in and the raycast estimate can be further refined incrementally. By selecting the most reliable zero crossing entry among the newly moved voxels at time t+1 and remapped raycast estimates $R_{t \to t+1}^*$ from time t, the new raycast estimate $R_{t+1}^*$ can be expressed as Equation 6:

$$R^*_{t \to t+1}(u, v) = \max_{\mathcal{R}(\cdot)} \{R^*_t(u', v') \ni \mathcal{F}_{t+1}(R^*_t(u', v')) = (u, v)\}$$

$$R^*_{t+1}(u, v) = \max_{\mathcal{R}(\cdot)} \{R^*_{t \to t+1}(u, v) \cup \{p_{0,v} \ni v \in V_{in}\}\}$$

where, $\mathcal{R}(\cdot)$ is the reliability measure associated with a zero crossing/raycast estimate and $\mathcal{F}_{t+1}$ is the forward projection operation for time t+1.

It is noted that the remapping stage can result in sparsification due to multiple raycast entries falling into the same voxel location during the forward projection operation. By initializing a random voxel entry neighboring the collision voxel location with the most reliable raycast estimate among the colliding candidates, dense raycast maps can readily be obtained. The reliability score associated with the newly initialized entry may be the same as the score of the most reliable candidate, but may be scaled by a fixed factor.

Flowchart 450 can conclude with storing volumetric representation 104a-104b/204a-204b of large-scale environment 102/202/302a/302b/302c of mobile reconnaissance unit 110/210/310a/310b/310c partially in GPU memory 122/222 and partially in CPU memory 142/242 (action 456). For example, in one implementation, the present mapping solution enables storing entire volumetric representation 104a-104b/204a-204b substantially continuously during the entire mapping of large-scale environment 102/202/302a/302b/302c, using the combined memory resources of GPU memory 122/222 and CPU memory 142/242. As a result, according to implementations of the present mapping solution, the size of the area to be mapped is not constrained by GPU memory 122/222 alone, thereby advantageously enabling the mapping of large-scale environments in real-time.

It is noted that, in use cases in which mobile reconnaissance unit 110/210/310a/310b/310c experiences one or more rapid or abrupt movements, such as jerking motions, during the first or second 3D scan, robotic system 100/200/300 can detect such movements using inertial sensor 116/216. In those situations, robotic system 100/200/300 may utilize one or both of GPU 120/220 and CPU 140/240 to generate perturbation data corresponding to the abrupt movement, and correct the mapping data for populating volumetric representation 104a-104b/204a-204b to compensate for the abrupt movement, using the perturbation data.

It is also noted that, in some implementations, as shown in FIG. 2, robotic system 100/200/300 may include display screen 232. In those implementations, robotic system 100/200/300 may display a visual representation of environment 102/202/302a/302b/302c of mobile reconnaissance unit 110/210/310a/310b/310c on display screen 232.

Thus, the present application discloses solutions for performing large-scale environmental mapping in real-time that address and overcome the deficiencies in the conventional art described above. By partitioning volumetric representations of an environment undergoing mapping between GPU memory and CPU memory, the present solution advantageously enables scalable, dense, mapping in real-time, while concurrently guaranteeing a fixed GPU memory footprint. In addition, by integrating color, depth, and inertial odometry measurements, the present solution further advantageously enables accurate mapping despite rapid or abrupt movements by a mobile reconnaissance unit used in the mapping process. Moreover, the present solution includes novel and inventive raycasting techniques for generating maps of portions of the environment previously scanned by the mobile reconnaissance unit, thereby facilitating robust drift quantization.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A robotic system comprising:
  a plurality of mobile reconnaissance units including a mobile reconnaissance unit having a color sensor, a depth sensor, and a graphics processing unit (GPU) with a GPU memory;
  a navigation unit communicatively coupled to the plurality of mobile reconnaissance units, the navigation unit having a central processing unit (CPU) with a CPU memory, wherein the navigation unit is a remote base station for all of the plurality of mobile reconnaissance units;
  the robotic system configured to:
    begin a three-dimensional (3D) scan of an environment of the mobile reconnaissance unit using the color sensor and the depth sensor;
    generate a mapping data for populating a volumetric representation of the environment produced using the GPU;
    continue the 3D scan of the environment using the color sensor and the depth sensor;
    update the mapping data based on the continued 3D scan; and
    partition the volumetric representation between the GPU memory and the CPU memory based on a memory allocation criteria;
  wherein the volumetric representation of the environment is stored partially in the GPU memory of the mobile reconnaissance unit and partially in the CPU memory of the navigation unit.

2. The robotic system of claim 1, wherein the navigation unit further comprises a display screen, and wherein the robotic system is further configured to display a visual representation of the environment of the mobile reconnaissance unit on the display screen.

3. The robotic system of claim 1, wherein the navigation unit is integrated with the mobile reconnaissance unit.

4. The robotic system of claim 1, wherein the mobile reconnaissance unit comprises an aerial vehicle.

5. The robotic system of claim 1, wherein the mobile reconnaissance unit comprises one of a wheeled vehicle, a legged vehicle, and a continuous track propulsion vehicle.

6. The robotic system of claim 1, wherein the mobile reconnaissance unit comprises a submersible vehicle.

7. A robotic system comprising:
  a mobile reconnaissance unit having a color sensor, a depth sensor, and a graphics processing unit (GPU) with a GPU memory;

a navigation unit communicatively coupled to the mobile reconnaissance unit, the navigation unit having a central processing unit (CPU) with a CPU memory;

the robotic system configured to:

begin a three-dimensional (3D) scan of an environment of the mobile reconnaissance unit using the color sensor and the depth sensor;

generate a mapping data for populating a volumetric representation of the environment produced using the GPU;

continue the 3D scan of the environment using the color sensor and the depth sensor;

update the mapping data based on the continued 3D scan; and partition the volumetric representation between the GPU memory and the CPU memory based on a memory allocation criteria;

wherein the volumetric representation of the environment is stored partially in the GPU memory of the mobile reconnaissance unit and partially in the CPU memory of the navigation unit, wherein the mobile reconnaissance unit further comprises an inertial sensor, and wherein the robotic system is further configured to:

detect an abrupt movement of the mobile reconnaissance unit during the second 3D scan, using the inertial sensor;

generate a perturbation data corresponding to the abrupt movement; and correct the mapping data to compensate for the abrupt movement using the perturbation data.

8. The robotic system of claim 7, wherein the navigation unit is a remote base station for controlling the mobile reconnaissance unit.

9. The robotic system of claim 7, wherein the mobile reconnaissance unit is one of a plurality of mobile reconnaissance units communicatively coupled to the navigation unit, and wherein the navigation unit is a remote base station for all of the plurality of mobile reconnaissance units.

10. A robotic system comprising:

a mobile reconnaissance unit having a color sensor, a depth sensor, and a graphics processing unit (GPU) with a GPU memory;

a navigation unit communicatively coupled to the mobile reconnaissance unit, the navigation unit having a central processing unit (CPU) with a CPU memory;

the robotic system configured to:

begin a three-dimensional (3D) scan of an environment of the mobile reconnaissance unit using the color sensor and the depth sensor;

generate a mapping data for populating a volumetric representation of the environment produced using the GPU;

continue the 3D scan of the environment using the color sensor and the depth sensor;

update the mapping data based on the continued 3D scan; and partition the volumetric representation between the GPU memory and the CPU memory based on a memory allocation criteria;

wherein the volumetric representation of the environment is stored partially in the GPU memory of the mobile reconnaissance unit and partially in the CPU memory of the navigation unit, and wherein the color sensor is an RGB camera, and the RGB camera and the depth sensor form an integrated RGB-D sensor of the mobile reconnaissance unit.

11. A method for use by a robotic system comprising a plurality of mobile reconnaissance units including a mobile reconnaissance unit having a color sensor, a depth sensor, and a graphics processing unit (GPU) with a GPU memory, and further including a navigation unit communicatively coupled to the plurality of mobile reconnaissance units and having a central processing unit (CPU) with a CPU memory, the navigation unit being a remote base station for all of the plurality of mobile reconnaissance units, the method comprising:

beginning a three-dimensional (3D) scan of an environment of the mobile reconnaissance unit using the color sensor and the depth sensor;

generating a mapping data for populating a volumetric representation of the environment produced using the GPU;

continuing the 3D scan of the environment using the color sensor and the depth sensor;

updating the mapping data based on the continued 3D scan; and partitioning the volumetric representation between the GPU memory and the CPU memory based on a memory allocation criteria;

wherein the volumetric representation of the environment is stored partially in the GPU memory of the mobile reconnaissance unit and partially in the CPU memory of the navigation unit.

12. The method of claim 11, wherein the navigation unit further includes a display screen, and wherein the method further comprises displaying a visual representation of the environment of the mobile reconnaissance unit on the display screen.

13. The method of claim 11, wherein the navigation unit is integrated with the mobile reconnaissance unit.

14. The method of claim 11, wherein the mobile reconnaissance unit comprises an aerial vehicle.

15. The method of claim 11, wherein the mobile reconnaissance unit comprises one of a wheeled vehicle, a legged vehicle, and a continuous track propulsion vehicle.

16. The method of claim 11, wherein the mobile reconnaissance unit comprises a submersible vehicle.

17. A method for use by a robotic system including a mobile reconnaissance unit having a color sensor, a depth sensor, and a graphics processing unit (GPU) with a GPU memory, and further including a navigation unit communicatively coupled to the mobile reconnaissance unit and having a central processing unit (CPU) with a CPU memory, the method comprising:

beginning a three-dimensional (3D) scan of an environment of the mobile reconnaissance unit using the color sensor and the depth sensor;

generating a mapping data for populating a volumetric representation of the environment produced using the GPU;

continuing the 3D scan of the environment using the color sensor and the depth sensor;

updating the mapping data based on the continued 3D scan; and partitioning the volumetric representation between the GPU memory and the CPU memory based on a memory allocation criteria;

wherein the volumetric representation of the environment is stored partially in the GPU memory of the mobile reconnaissance unit and partially in the CPU memory of the navigation unit, wherein the mobile reconnaissance unit further includes an inertial sensor, and wherein the method further comprises:

detecting a abrupt movement of the mobile reconnaissance unit during the second 3D scan, using the inertial sensor;

generating a perturbation data corresponding to the abrupt movement; and correcting the mapping data to compensate for the abrupt movement using the perturbation data.

18. The method of claim 17, wherein the navigation unit is a remote base station for controlling the mobile reconnaissance unit.

19. The method of claim 17, wherein the mobile reconnaissance unit is one of a plurality of mobile reconnaissance units communicatively coupled to the navigation unit, and wherein the navigation unit is a remote base station for all of the plurality of mobile reconnaissance units.

20. A method for use by a robotic system including a mobile reconnaissance unit having a color sensor, a depth sensor, and a graphics processing unit (GPU) with a GPU memory, and further including a navigation unit communicatively coupled to the mobile reconnaissance unit and having a central processing unit (CPU) with a CPU memory, the method comprising:

beginning a three-dimensional (3D) scan of an environment of the mobile reconnaissance unit using the color sensor and the depth sensor;

generating a mapping data for populating a volumetric representation of the environment produced using the GPU;

continuing the 3D scan of the environment using the color sensor and the depth sensor;

updating the mapping data based on the continued 3D scan; and partitioning the volumetric representation between the GPU memory and the CPU memory based on a memory allocation criteria;

wherein the volumetric representation of the environment is stored partially in the GPU memory of the mobile reconnaissance unit and partially in the CPU memory of the navigation unit, and wherein the color sensor is an RGB camera, and the RGB camera and the depth sensor form an integrated RGB-D sensor of the mobile reconnaissance unit.

* * * * *